(12) United States Patent
Pestrue (10) Patent No.: US 7,163,011 B2
(45) Date of Patent: Jan. 16, 2007

(54) OUTDOOR GAS GRILL WITH AUXILIARY BURNER UNIT, AND METHOD OF USING SAME

(75) Inventor: Jeffrey A. Pestrue, St. Louis, MI (US)

(73) Assignee: Eastman Outdoors, Inc., Flushing, MI (US)

( * ) Notice: Subject to any disclaimer, the term of this patent is extended or adjusted under 35 U.S.C. 154(b) by 701 days.

(21) Appl. No.: 09/971,866

(22) Filed: Oct. 5, 2001

(65) Prior Publication Data

US 2003/0066522 A1 Apr. 10, 2003

(51) Int. Cl.
*A47J 37/00* (2006.01)
*F24C 3/00* (2006.01)

(52) U.S. Cl. ............... 126/50; 126/37 B; 126/41 R; 126/41 D; 126/41 E; 126/36

(58) Field of Classification Search ........... 126/37 B, 126/36, 38, 40, 50, 41 R, 37 R, 25 A, 25 AA, 126/41 E, 41 D; 219/45.13; 99/339
See application file for complete search history.

(56) References Cited

U.S. PATENT DOCUMENTS

| | | | | |
|---|---|---|---|---|
| 405,274 A | * | 6/1889 | Sagrer ..................... | 126/44 |
| 600,833 A | * | 3/1898 | Kinsey et al. ............. | 126/53 |
| 732,470 A | * | 6/1903 | Tatham, Jr. .............. | 126/39 R |
| 838,421 A | * | 12/1906 | Kerstetter ................. | 126/36 |
| 967,783 A | * | 8/1910 | Kellog ..................... | 312/283 |
| 1,010,169 A | * | 11/1911 | Noreck ..................... | 99/446 |
| 1,153,597 A | * | 9/1915 | Buttler ..................... | 312/236 |
| 1,173,742 A | * | 2/1916 | Roos ........................ | 99/390 |
| 1,271,796 A | * | 7/1918 | Stivers et al. ............ | 99/379 |
| 1,371,191 A | * | 3/1921 | Arundel ................... | 126/39 R |
| 1,431,953 A | * | 10/1922 | Henoch .................... | 219/476 |
| 1,496,344 A | * | 6/1924 | Levinson .................. | 126/38 |
| 2,004,937 A | * | 6/1935 | Fletcher ................... | 219/392 |
| 2,205,435 A | * | 6/1940 | Raber ...................... | 126/41 E |
| 2,283,853 A | * | 5/1942 | Frick ....................... | 126/41 E |
| 2,331,707 A | * | 10/1943 | Lotter ..................... | 126/41 E |
| 2,355,230 A | * | 8/1944 | Moecker et al. .......... | 126/41 R |
| 2,526,476 A | * | 10/1950 | Ham ........................ | 219/392 |
| 2,885,253 A | * | 5/1959 | Kesling .................... | 312/236 |
| 3,065,327 A | * | 11/1962 | Coultrip .................. | 219/449.1 |
| 3,130,719 A | * | 4/1964 | Mayer et al. ............. | 126/37 B |
| 4,144,870 A | * | 3/1979 | Reynolds ................. | 126/41 E |
| 4,282,853 A | * | 8/1981 | Reynolds ................. | 126/19 R |

(Continued)

FOREIGN PATENT DOCUMENTS

DE 512506 * 6/1928

(Continued)

*Primary Examiner*—Carl D. Price
(74) *Attorney, Agent, or Firm*—Carrier, Blackman & Associates, P.C.; William D. Blackman; Joseph P. Carrier (57) ABSTRACT

A gas grilling apparatus includes a cart, a grill housing attached to the cart, and a grill and a main grill burner contained in the grill housing. An auxiliary burner unit is also attached to the cart, and the auxiliary burner unit is located, or is placeable at a level below the main grill burner. The auxiliary burner unit may be made height-adjustable, and enhances the ability of the user to view or remove the contents of a pot or pan having high side walls.

3 Claims, 6 Drawing Sheets

U.S. PATENT DOCUMENTS

| | | |
|---|---|---|
| 4,587,948 A | 5/1986 | Haglund |
| 4,677,964 A | 7/1987 | Lohmeyer et al. |
| 4,759,276 A | 7/1988 | Segroves |
| 4,862,792 A | 9/1989 | Lerma, Jr. |
| 4,886,045 A | 12/1989 | Ducate, Jr. et al. |
| 5,104,080 A | 4/1992 | Berger |
| 5,280,152 A * | 1/1994 | Lee .......................... 219/622 |
| 5,313,928 A | 5/1994 | Rodgers et al. |
| 5,327,879 A * | 7/1994 | Ferraro .................... 126/41 R |
| 5,490,494 A | 2/1996 | Giebel et al. |
| 5,632,265 A | 5/1997 | Koziol |
| 5,878,739 A * | 3/1999 | Guidry ..................... 126/25 R |
| 5,921,229 A * | 7/1999 | Blake ...................... 126/275 R |
| 6,067,978 A | 5/2000 | Schlosser et al. |
| 6,192,878 B1 | 2/2001 | Waters |
| 6,293,272 B1 * | 9/2001 | Harneit ..................... 126/37 B |

FOREIGN PATENT DOCUMENTS

FR              1191436      * 10/1902

* cited by examiner

OUTDOOR GAS GRILL WITH AUXILIARY BURNER UNIT, AND METHOD OF USING SAME

BACKGROUND OF THE INVENTION

1. Field of the Invention

The present invention relates to a gas-powered grill apparatus for cooking and warming food outdoors, and to a method of using same. More particularly, the present invention relates to an outdoor gas grill apparatus, including a side-mounted auxiliary burner for placement at a lower height than a main grill burner, and to a method of using the grill apparatus.

2. Description of the Background Art

Outdoor gas grills are widely used in the fields of residential and commercial cooking. In particular, outdoor gas grills, using compressed gaseous fuel such as propane, LPG or LNG are commercially available, and are commonly used for barbecue-style cooking.

A conventional outdoor gas grill generally includes a burner element positioned beneath heat-tolerant lava rocks or briquettes, and a grate or grilling surface, positioned above the burner assembly and briquettes. Aside from their general construction, the previously known outdoor gas grills can differ significantly in size, and can also differ as to what options a particular outdoor grill may include.

By way of example, an outdoor grilling apparatus may be stationary with removable grilling units (U.S. Pat. No. 5,632,265), portable, incorporating swing-out food and briquette grates (U.S. Pat. No. 4,862,792), or may include a height-adjustable work shelf attached to a main grill body (U.S. Pat. No. 5,104,080).

Additionally, some of the known outdoor gas grilling apparatus may be equipped with a burner unit and associated support rack, similar to that of a kitchen range/cooktop, capable of cooking or warming food in a cooking utensil (e.g. pot or pan).

Several variants of outdoor gas grilling apparatus, incorporating at least one burner unit, are illustrated in U.S. Pat. Nos. 4,886,045, 6,067,978 and 6,192,878.

As previously stated, traditional outdoor gas grilling apparatus perform the tasks of cooking and warming food on a grilling surface or grate; the operation of which is illustrated in U.S. Pat. No. 6,067,978. The disclosure of U.S. Pat. No. 6,067,978 is incorporated by reference herein.

U.S. Pat. No. 6,067,978, issued to Schlosser et al., entitled, "Outdoor Cooking Apparatus With Improved Auxiliary Gas Burner," discloses a portable, gas fuel-burning, outdoor cooking apparatus including a stationary grill, an auxiliary gas burner located to one side of the stationary grill, and an additional foldable work surface. The Schlosser et al. invention uses a unitary fuel source for both the grill and auxiliary burner. The auxiliary burner is affixed to a first side of the cooking apparatus, while food preparation surfaces are positioned along the opposing side of the cooking apparatus.

U.S. Pat. No. 4,886,045, issued to Ducate, Jr. et al., entitled, "Side Burner Attachment For Gas-Fired Grill," discloses a side burner attachment for outdoor gas grills. The Ducate, Jr. et al. side burner assembly includes two outwardly extending bars which enable the side burner to be secured to the grilling apparatus.

U.S. Pat. No. 5,490,494, issued to Giebel et al., entitled, "Side Burner for Barbecue Gill," discloses a side burner with a hinged covering lid for an outdoor gas grilling apparatus. The side burner of Giebel et al. includes an assembly for receiving fuel from the existing fuel source of the grilling apparatus, and attaches to an outdoor grilling apparatus in a static position. The side burner includes a hinge-mounted covering lid, which functions as an additional worktop when the side burner is not in use.

As noted above, some of the known outdoor gas grilling apparatus incorporate a side or auxiliary burner to provide for cooking or warming food in a pot or pan, separate from the main grilling area. However, in the known designs, the auxiliary burners are secured to the grilling apparatus in a fixed position, generally at a height substantially parallel to, and abutting or spaced only slightly away from the main grilling surface.

However, this known burner arrangement is not optimal for all applications because, while food cooked on the grilling surface is normally placed directly thereon, and is therefore easily accessible to a user, in contrast, food cooked in boiling water, in hot oil, or in a stockpot must be placed in a pot having relatively high side walls. When such a tall pot is placed on a burner located at substantially the same level as the grilling surface, the top edge of the pot is raised significantly higher than the grilling surface, and as a result, it may become difficult to see into the interior of the pot.

With the above-described arrangement of burners, placing, removing and/or viewing the contents of a pot or pan with high side walls, such as a stockpot or fry pot, becomes a difficult task.

As a result, a need still exists in the art for an outdoor gas grilling apparatus which provides an auxiliary burner at a significantly lower height than the main grilling surface, to allow a user of the grill to ergonomically accommodate the use of any size pot. Preferably, such a grill would have an auxiliary burner placed at a height low enough that a person using the grill could easily see the contents of a pot on the auxiliary burner.

It would be particularly advantageous if an auxiliary burner unit could be made adjustable in height, to allow a user to select a comfortable cooking height for the burner.

SUMMARY OF THE INVENTION

The present invention has been developed to overcome the foregoing limitations and disadvantages of known outdoor gas grilling apparatus, and to generally fulfill a need in the art for an outdoor grilling apparatus with an auxiliary burner placed at a significantly lower height than the main grilling surface.

In one embodiment of the invention, the auxiliary burner is made height-adjustable with respect to the main grilling surface, in order to alleviate the problems associated with the fixed position of burner units of traditional outdoor gas grilling apparatus.

An outdoor gas grilling apparatus, in accordance with the present invention, includes a cart, a grill housing, a grill and a main grill burner in the grill housing, and an auxiliary burner unit attached to the cart.

The auxiliary burner unit is disposed at, or is adjustably placeable at a lower height than the height of the main grill burner.

The grill housing is mounted on the upper section of the cart. The grill housing includes a substantially shell-shaped base, and a cover which is pivotally attached to the base. Optionally, the cover may be made in two independently movable sections, to accommodate singular use of either the grilling surface/grate or main burner unit.

The grill housing also contains a fuel conduit for connection to a fuel source, fuel control valves, one or more burner elements, and a grate or grid-shaped grilling surface. Optionally, the grill housing may also contain a secondary burner unit and an associated support rack for supporting a cooking utensil such as a pot or pan thereon.

It is an object of the present invention to provide an outdoor gas-powered barbeque grill apparatus that includes a main grill burner, and also includes an auxiliary burner unit situated at a lower height than the main grill burner.

It is another object of the present invention to provide a height-adjustable mounting system by which the auxiliary burner unit may slidably move, relative to the grill housing.

Preferably, an auxiliary burner in accordance with the invention also includes a control valve for adjusting the rate at which fuel is burned, independent of any other control valves for the main grilling unit of the outdoor grilling apparatus.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENTS

Figure 1:
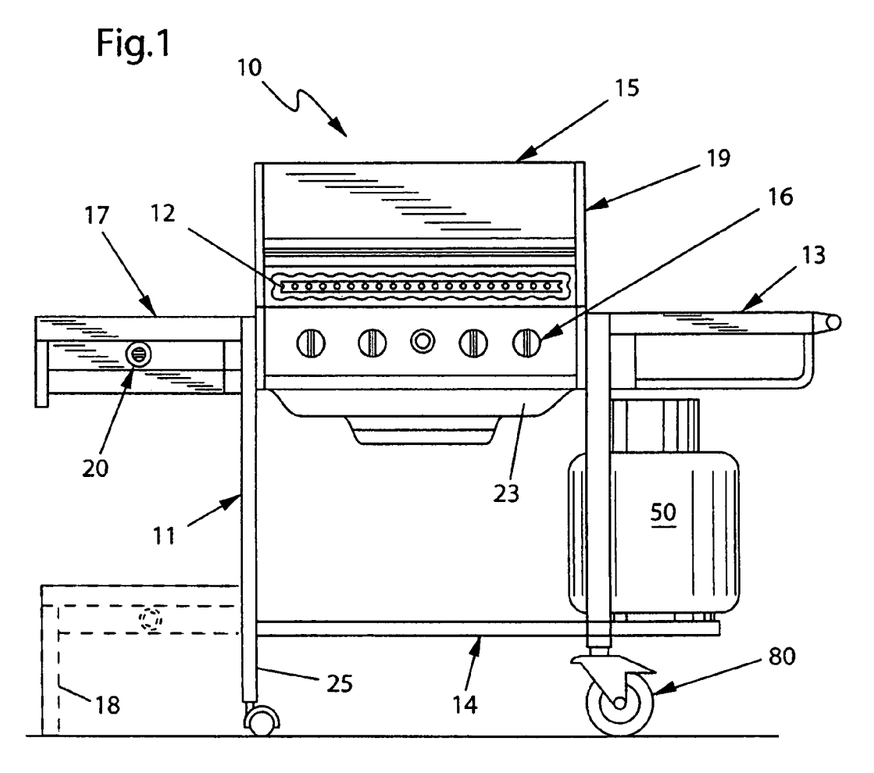
FIG. 1 is a front plan view of a gas grill apparatus in accordance with a first embodiment of the present invention, shown partially cut away, with an auxiliary burner unit thereof shown in a raised position, and with an alternate position of the auxiliary burner unit shown in phantom.

Referring now to the drawings, an outdoor gas grill apparatus, according to a first embodiment of the invention, is shown generally at 10 in FIG. 1. A modified grill apparatus 110 is shown in FIGS. 2–3, sharing many of the features of the grill 10 of FIG. 1.

Figure 2:
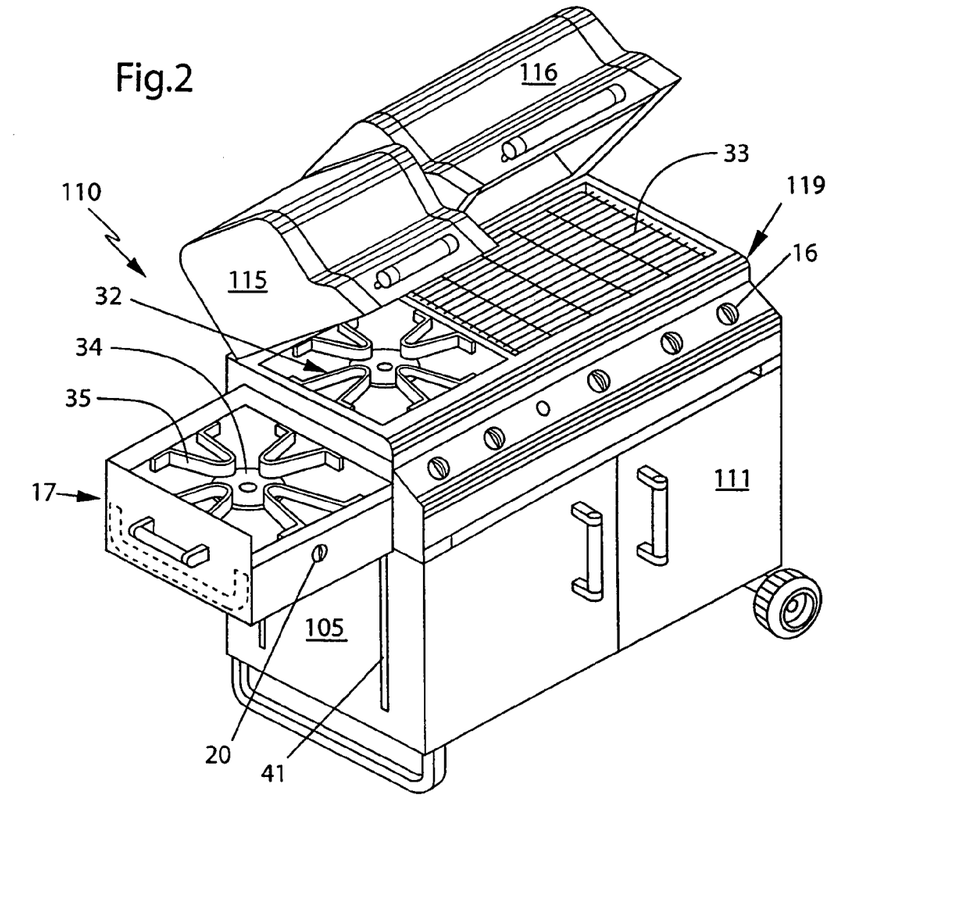
FIG. 2 is a perspective view of a second gas grill apparatus, which is a modified version of the apparatus of FIG. 1, with an auxiliary burner unit thereof shown in a raised position.
Figure 3:
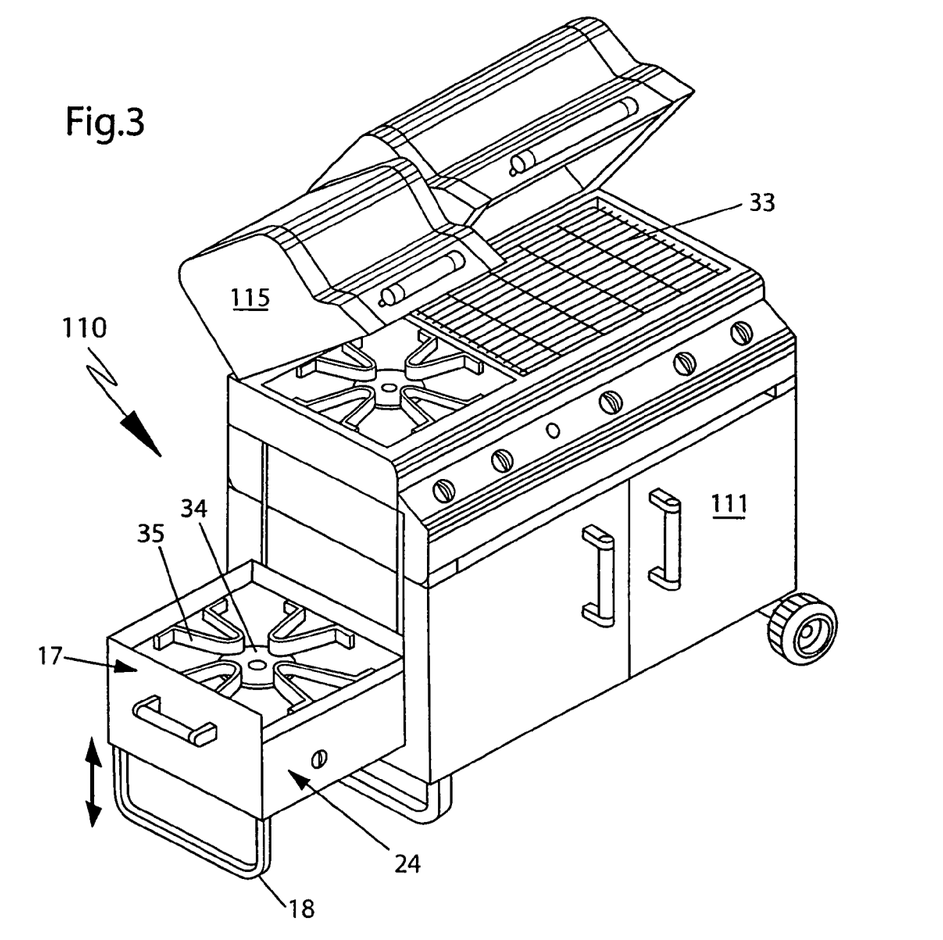
FIG. 3 is a perspective view of the gas grill apparatus of FIG. 2, with the auxiliary burner unit shown in a lowered position, and with a support leg extended downwardly from the auxiliary burner unit.

Each of the grill apparatus 10, 110 of FIGS. 1 and 2 includes a height-adjustable auxiliary burner unit 17 at a side surface thereof, as will be further discussed herein.

The outdoor grill apparatus 10 of the first embodiment includes a cart 11 having a frame with a substantially rectangular box-like (parallelepiped) outline, including a support leg 25 extending downwardly at each of the four corners thereof.

In the depicted embodiment, the cart 11 includes a substantially horizontal lower platform 14 for supporting a fuel source 50 thereon, as well as for storing miscellaneous items. The cart 11 may, optionally, be enclosed and equipped with doors and/or shelves (see FIGS. 2 and 3), as desired for a particular application.

The cart 11 and lower platform 14 thereof, as well as the optional enclosure, doors, and shelves, may be constructed from any rigid fire-resistant material, and is preferably made from a metal such as steel or aluminum. The cart 11 as shown in the first embodiment 10 includes wheels 80, preferably with a wheel secured to the bottom of each leg 25. Optionally, the cart 11 may include only two wheels 80 or may not include any wheels.

The grilling apparatus 10 also includes a hollow grill housing 19, which is fixably secured to the cart 11 using conventional fasteners, such as nuts and bolts. Alternatively, the grill housing 19 may be affixed to the cart 11 by welding. The grill housing 19 contains a main burner element 12, a grate or grilling surface 33 for supporting food thereon while cooking, and a plurality of control valves 16. Optionally, the grill housing 19 may also contain a enclosed secondary burner unit 32 (FIG. 2).

The grill housing 19 is constructed from a rigid, heat-tolerant material, preferably a metal. The grill housing 19 includes a hollow, substantially shell-shaped base 23, and a cover 15 pivotally attached to the base.

The cover 15 is provided to protect the contents of the housing 19 when the apparatus is not in use, and also to permit access to the grilling surface 33 and/or the enclosed secondary burner unit 32. The cover 15 may be of unitary construction, or may be made in two pieces as shown at 115, 116 in FIG. 2, to selectively allow independent access to either or both of the grilling surface 33 and the enclosed secondary burner 32.

Optionally, the cover 15 may also include a viewing window (not shown) constructed from heat-tempered glass or the like, and may also include a temperature display, such as an analog or digital display or color coded bar, to display the internal temperature of the grill housing 19.

Another optional feature of the grilling apparatus 10 is a worktop 13 for supporting food and dishes before and after cooking. Where used, the worktop 13 is provided adjacent to one side of the grill housing 19 and secured to the cart 11. The worktop 13 may be constructed from any durable, rigid material such as steel, plastic, wood, ceramic tile, or the like, and may include hooks or a bar for accommodating cooking utensils. Additionally, the worktop 13 may optionally include a cutting board, which may be made slide-out, fold-out or removably held within a frame support of the worktop.

The grill apparatus 110 in the embodiment of FIG. 2 is somewhat different from the grill apparatus 10 depicted in FIG. 1. This is because the grill 110 of FIG. 2 includes a grill housing 119 having a two-part cover 115, 116 and also includes an enclosed secondary burner 32 therein, in addition to the main grill burner 12.

As noted, the grilling apparatus 10, 110 according to the present invention includes an auxiliary burner unit 17. In the depicted embodiments, the auxiliary burner unit 17 is mounted to a side wall of the cart 11, adjacent to a side surface of the grill housing 19. The auxiliary burner unit 17 includes an auxiliary burner housing 24 having front, back and side walls, constructed from material in kind to that of the grill housing 19. The auxiliary burner housing 24 encloses the auxiliary burner 34, a support rack 35 disposed above the burner for supporting a cooking utensil thereon, and a fuel conduit, regulator valve and control dial 20.

Another optional feature, which may be included as part of the auxiliary burner unit 17 according to the invention, is a concealable downwardly extensible support leg 18, 218 which may be provided for additional support when the auxiliary burner unit 17 is in a lowered position thereof. The support leg 18, where used, may be downwardly extended from the auxiliary burner unit 17 in a telescoping manner for enhanced stability. Alternatively, the support leg 18 may optionally be made so as to be capable of being folded or unfolded from underneath the auxiliary burner unit 17.

In the most basic embodiment of the invention, the auxiliary burner unit 17 may be permanently fixed in position relative to the cart 11, at the lowered position thereof shown in FIG. 3, and with the auxiliary burner thereof disposed at a height substantially lower than the height of the main grill burner 12.

As previously discussed, this reduced height burner is provided to allow a user to simultaneously cook food on the grill 33 and also in a tall pot (not shown) having high side walls, such as a deep fryer, boiling pot, or steamer. By placing the tall pot on the auxiliary burner unit 17, at a lower height than the main grill 33, a user of the apparatus 10, 110 is better able to see inside the pot, and is also able to conveniently remove or view the contents of such a tall pot.

Figure 5:
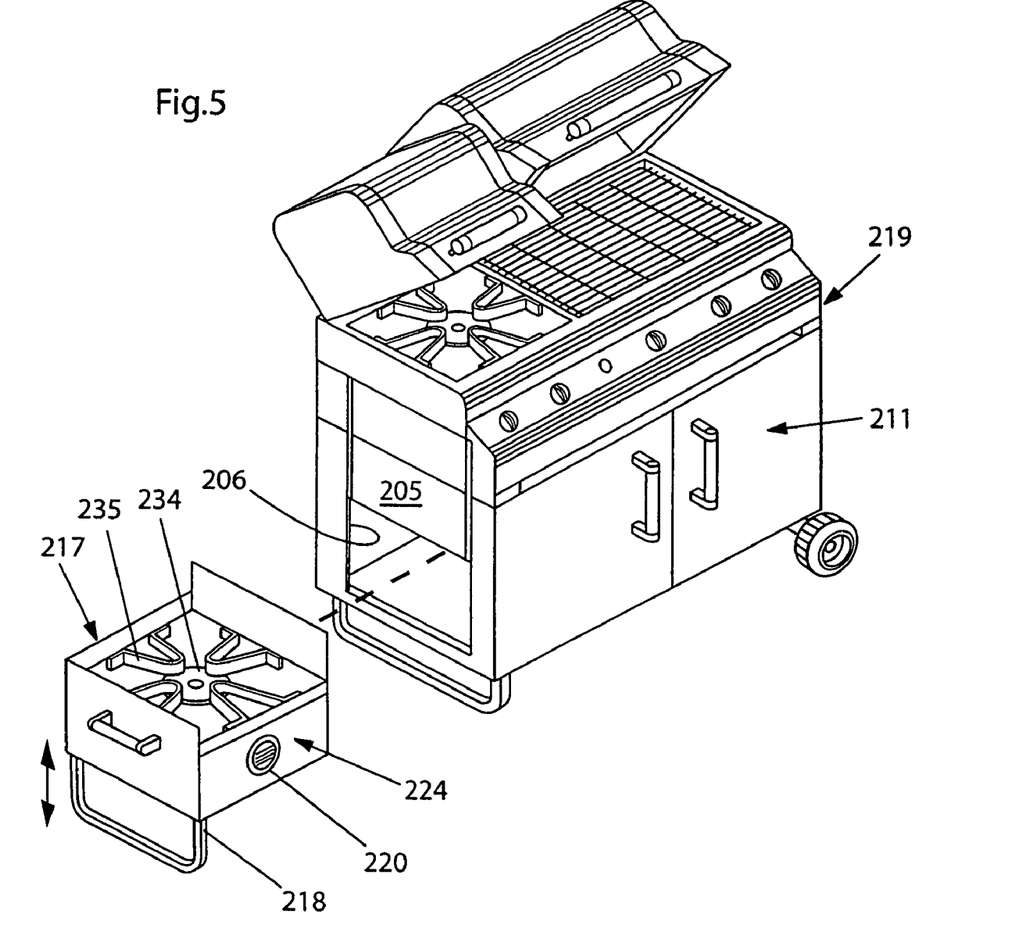
FIG. 5 is an exploded perspective view of a gas grill apparatus in accordance with a third embodiment of the invention, showing an auxiliary burner unit separated and spaced away from the main grill cart.
Figure 6:
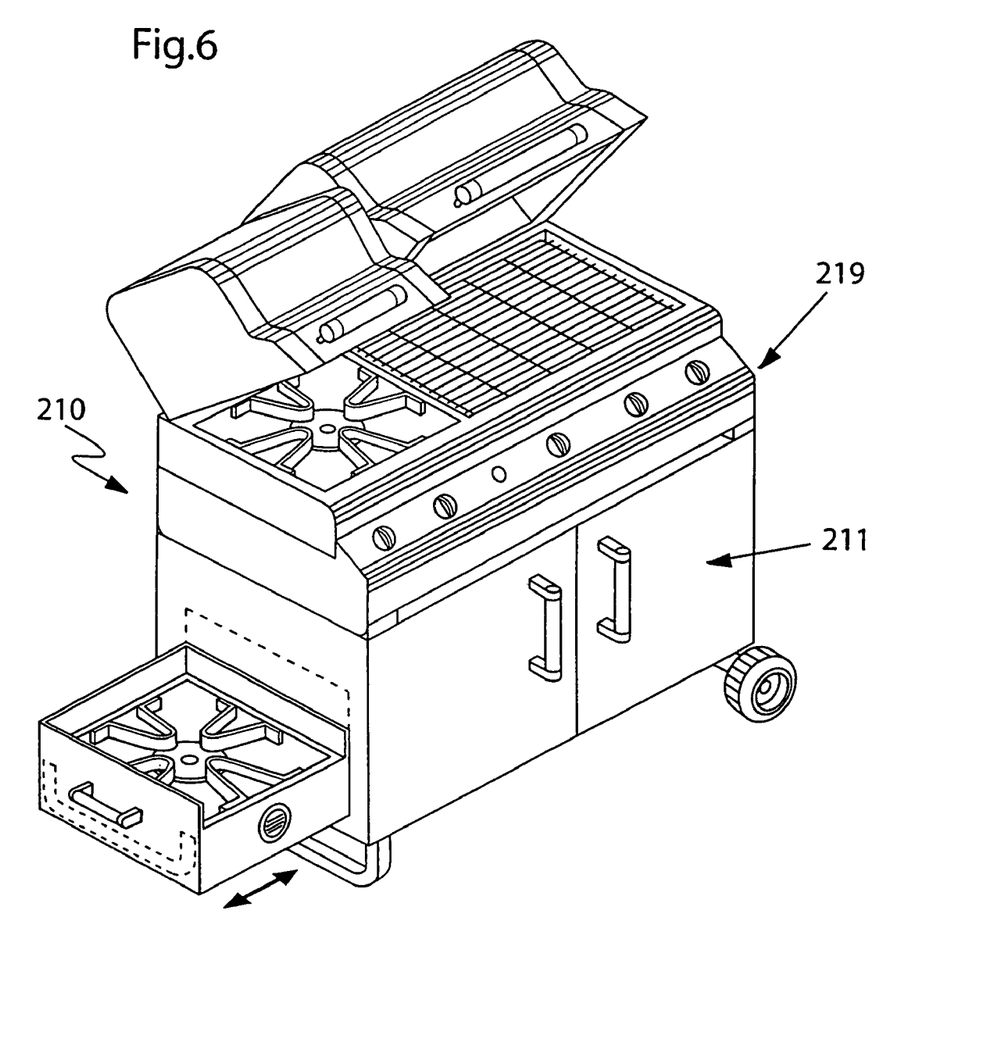
FIG. 6 is an assembled view of the gas grill apparatus of FIG. 4, showing the auxiliary burner unit installed in its normal position on the grill.

However, in the most preferred embodiments of the invention, the auxiliary burner unit 17, 217 is made movable with respect to the cart 11, 211 to provide flexibility to a user of the apparatus 10, 110. The auxiliary burner 17 may be made to be height-adjustable, as in the embodiment of FIGS. 2–4, or alternatively, the auxiliary burner 217 may be made in the form of a drawer which can be horizontally slid in and out of the cart 211, as shown in FIGS. 5–6.

Figure 4:
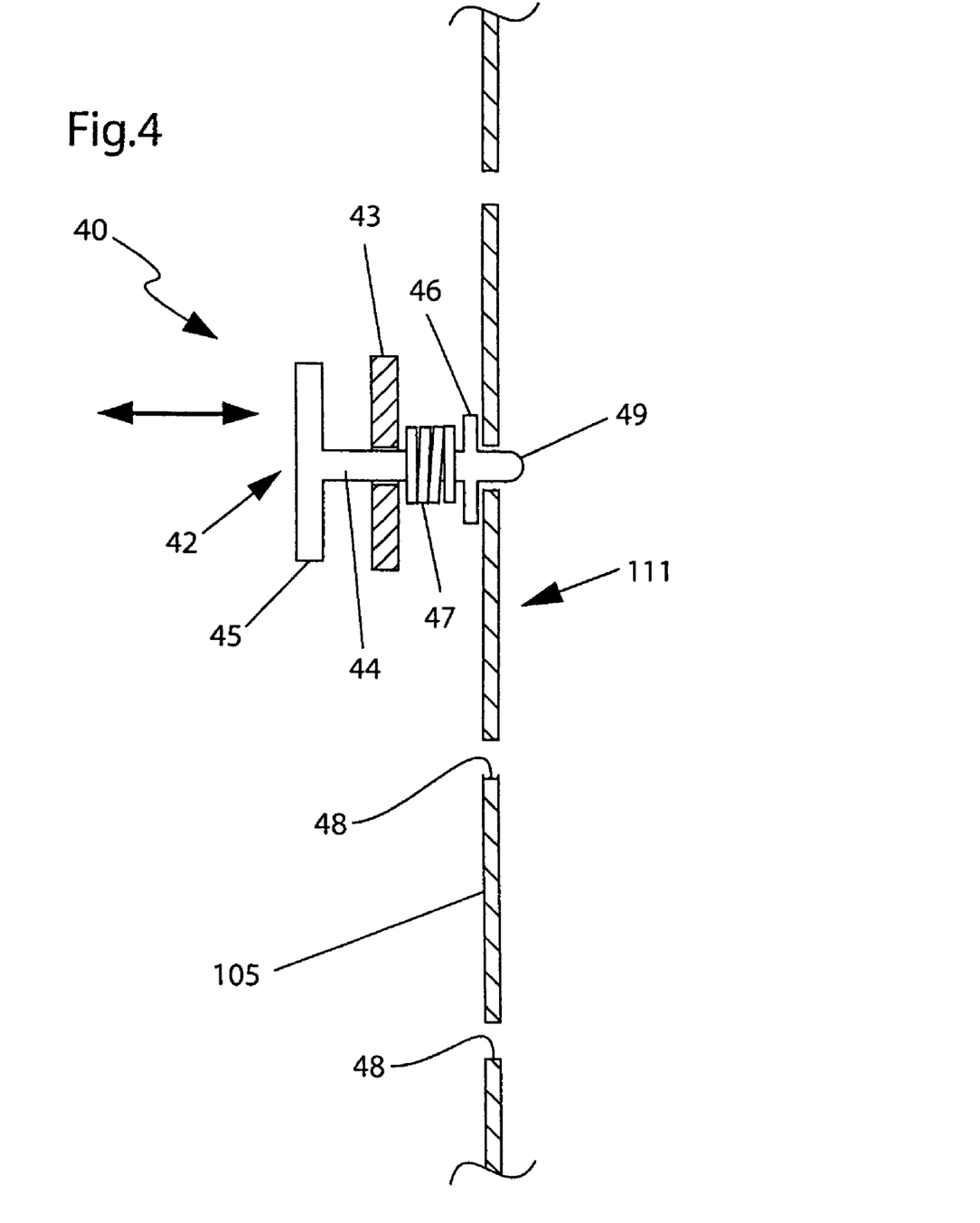
FIG. 4 is a detail side plan view, partially in cross-section, of a latching mechanism which is part of the gas grill apparatus of FIGS. 2–3.

In the embodiment of FIGS. 2–4, the height of the auxiliary burner unit 17 is adjusted through a height adjustment mechanism 40, which operates in conjunction with a track 41 built into a side wall of the cart 11. The height adjustment mechanism includes a releasable latch 42 to enable downward or upward movement of the auxiliary burner unit 17 relative to the cart 11.

Referring now to FIG. 4, it will be seen that in the illustrated embodiment, the latch 42 is attached to a support bar 43, which is operatively attached to the auxiliary burner housing 24. The latch 42 includes a shaft 44 which fits through a hole formed in the bar 43. The latch 42 also includes a handle 45 to allow a user to grasp and pull the latch outwardly. A stop washer 46 is fixedly attached to the shaft 44, and a spring 47 is provided on the shaft 44 between the support bar 43 and the stop washer 46, as shown.

The tip end of the shaft 44 forms a detent 49, which fits into any one of a number of alternate openings 48 formed in the side wall 105 of the cart 111. When the auxiliary burner unit 17 is placed at a selected height, the latch handle 45 is released, and the spring 47 pushes against the bar 43 and moves the detent 49 into the appropriate opening 48, to temporarily and disengagably fix the position of the auxiliary burner unit 17 with respect to the cart 111.

In an alternative design to that shown in FIG. 4, the height-adjustment mechanism 40 could include a geared or chain conveyor assembly (not shown) or else could operate through the tightening and loosening of a carriage bolt assembly.

Additionally, the auxiliary burner unit 17 may optionally include a lid or cover to provide an additional worktop when not in use.

Referring now to FIGS. 5–6, a third embodiment of a gas grilling apparatus in accordance with the invention is shown at 210. The grilling apparatus 210 is substantially identical to the apparatus 110 of FIGS. 2–3, except as shown differently in the drawings, and as specifically described as different in the following paragraphs.

In the embodiment of FIGS. 5–6, the apparatus 210 includes a an enclosed cart 211 similar to the cart 111, and having a side wall 205 with a large rectangular opening 206 formed therethrough. An auxiliary burner unit 217 is also provided as part of the apparatus 210, and the auxiliary burner unit fits slidably within the opening 206 in the cart side wall 205.

The auxiliary burner unit 217 includes an auxiliary burner housing 224 having front, back and side walls, constructed from material in kind to that of the grill housing 219. The auxiliary burner housing 224 encloses an auxiliary burner 234, a support rack 235 disposed above the burner for supporting a cooking utensil thereon, and a fuel conduit, regulator valve and recessed control dial 220.

Another optional feature, which may be included as part of the auxiliary burner unit 17 according to the invention, is a concealable downwardly extensible support leg 18, 218 which may be provided for additional support when the auxiliary burner unit 17 is in a lowered position thereof. The present invention also relates to a kit of components for constructing a gas-operated grill. A grill kit according to the present invention includes a cart frame for assembling into a cart 11. The kit further includes a grill housing 19 for containing a grill burner 12 and a grill 33. The kit also includes a grill burner 12 and a grill 33 as previously described herein. Furthermore, a kit according to the invention includes an auxiliary burner unit for mounting to the cart 11 at a position below the grill burner.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

What is claimed is:

1. A grilling apparatus, comprising:
    a cart comprising guide structure for guiding movement of an auxiliary burner unit thereon, said guide structure comprising at least one rail;
    a grill housing attached to the cart;
    a grill disposed in the grill housing;
    a main grill burner in the grill housing below the grill, said main grill burner being substantially fixed in place in relation to the cart;
    an auxiliary burner unit which is adjustably attached to the cart, said auxiliary burner unit including an auxiliary burner, and being movable to a position below the main grill burner;
    wherein normal movement of said auxiliary burner unit, relative to said cart, is restricted by said guide structure to substantially linear movement; and
    a worktop attached to the cart adjacent the grill housing.

2. A grilling apparatus, comprising:
    a cart comprising guide structure for guiding movement of an auxiliary burner unit thereon;
    a grill housing mounted on to the cart;
    a main grill burner and a grill in the grill housing, said main grill burner being substantially fixed in place in relation to the cart;
    a height-adjustable auxiliary burner mounted adjacent to the grill housing, the auxiliary burner being selectively movable between a raised position and a lowered position in which the auxiliary burner is situated below the main grill burner;

wherein said auxiliary burner is operable in each of the raised and lowered positions thereof, and wherein normal movement of said auxiliary burner, relative to said cart, is restricted by said guide structure to substantially linear movement; and a worktop attached to the cart adjacent the grill housing.

3. A method of adjusting an auxiliary burner on an outdoor grilling apparatus having a cart and a grill burner associated with said cart, the method comprising the steps of:

a) releasing a latch mechanism to free an auxiliary burner unit attached to a cart side wall in a first operative position thereof, said auxiliary burner unit comprising said auxiliary burner;

b) slidably moving said auxiliary burner unit into a second operative position below said grill burner, wherein said movement is in a substantially linear direction, and wherein said auxiliary burner of said auxiliary burner unit is operable in each of the first and second operative positions.

* * * * *